L. F. WARD.
Corn Husker.
No. 19,458. Patented Feb. 23, 1858.
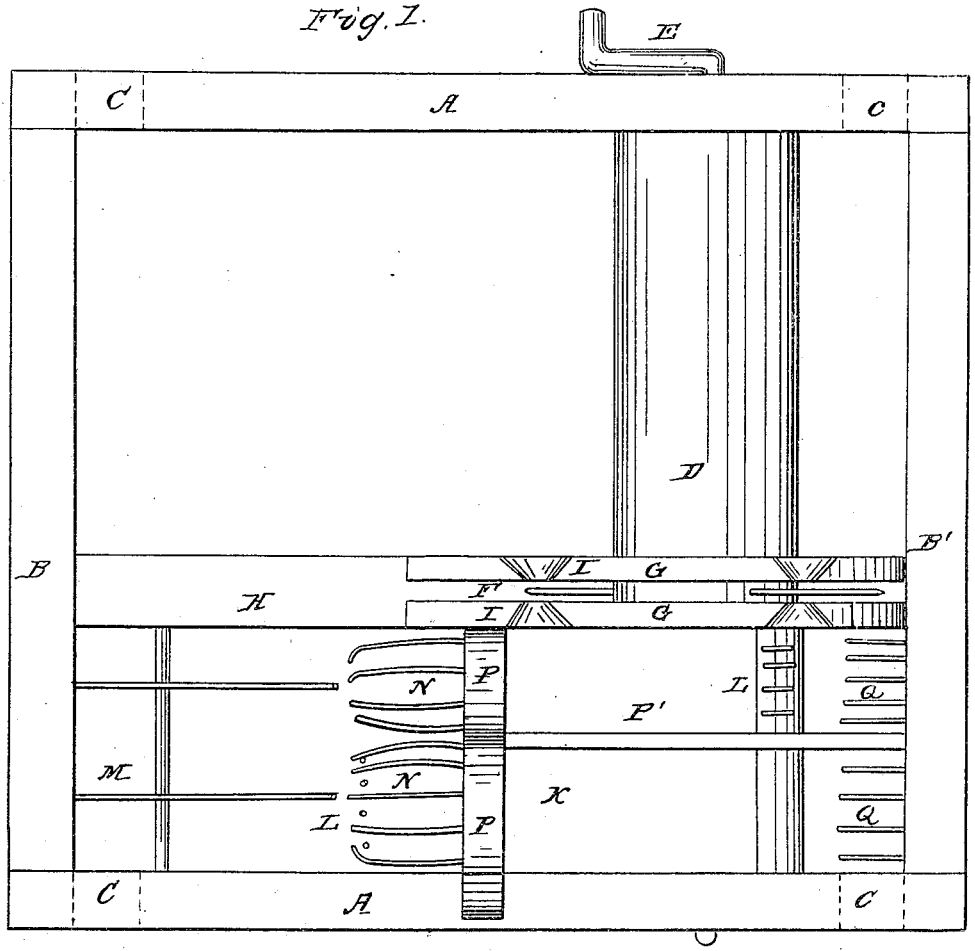
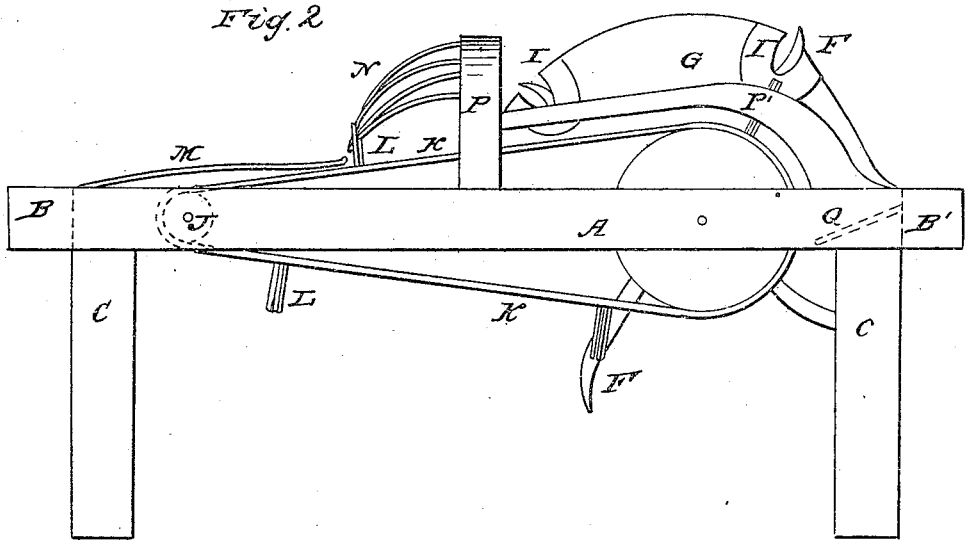

UNITED STATES PATENT OFFICE.

L. F. WARD, OF MARATHON, NEW YORK.

CORN-HUSKER.

Specification of Letters Patent No. 19,458, dated February 23, 1858.

*To all whom it may concern:*

Be it known that I, L. F. WARD, of Marathon, in the county of Courtlandt and State of New York, have invented a new and useful Machine for Husking Corn; and I do hereby declare that the same is described and represented in the following specifications and drawings.

To enable others skilled in the art to make and use my invention I will proceed to describe its construction and use referring to the drawings in which the same letters indicate like parts in each of the figures.

Figure 1, is a plan or top view of my corn husker. Fig. 2, is an elevation of one side of the same.

The nature of my invention consists in a revolving belt armed with teeth which carry the ears of corn forward under stationary prongs which hold the husks and yield to let the ears of corn pass or be carried forward by said belt and teeth so as to separate the ear from the husk. Also in some rotating knives in combination with two scored arches or segments for the purpose of severing the stalks from the butts of the ears of corn; and in some wires or prongs to clear the husks from the teeth on the belt; and from the underside of the ears of corn.

In the accompanying drawings, A, are the sides and B, B', the ends of a rectangular frame, which is supported by four legs C, C, at a convenient height for the operator, D, is a roller fitted to turn in the rails A, A, and may be provided with a crank like E at each end, or with a pulley or gear to turn it and operate the machine. This roller D, is armed with one or more knives F, standing at a right angle from its surface at a proper distance from one side of the frame. These knives as they are carried around by the roller, pass between the arches or segments G, G, which are fastened to the end B' of the frame and to the bar H which connects them to the end B as shown in the drawing. The segments G, G, are provided with scores I I into which the butts of the ears are thrust so that the knives as they pass around will sever the stalk from the ear and prepare it to be husked.

The roller J, shown by dotted lines in Fig. 2, is provided with journals fitted to turn in the side A, and bar H, to carry the endless belt K, which passes around the rollers D, and J. This belt K, is provided with several series of teeth or prongs L, L, before which the ears of corn are laid (after the butt stalks have been severed by the knives above mentioned) and carried under the stationary prongs N, N, which retain the husks but yield so as to let the ears of corn be carried forward by the teeth L L and pushed off of the end of the machine. There may be one or more wires like M, M, fastened in the end B, and made to extend over the belt K, as shown in Fig. 2, to catch any husks that may adhere to the under side of the ear of corn. The prongs N, N, are fastened to the arches P, P, which arches are fastened to the side A and segment G, and stayed by the brace P', which connects them to the end B' as shown in the drawing. The inclined wires or prongs Q, Q, are intended to clear the corn husks from the teeth L, L, on the belt K, should the husks adhere to the teeth. When another set of segments are applied they should be set so far from G, G, as to allow the butt stalks cut off to fall between. I think the husks will be likely to come off easiest, if the ears are laid so as to be carried under the prongs N, N, butt end first.

In operating this machine the branch stalk which supports the ear is broken from the upright stalk and the branch stalk with the butt of the ear is thrust into one of the scores I, and held until the stalk is severed from the ear, which is laid lengthwise on the belt K, before one of the series of teeth L, which carry it under the prongs N, N, which retain the husks but yield, so as to allow the ear to be carried forward by the belt and teeth and pass off, at the end of the machine.

Although I have shown and described but one belt, I contemplate that the roller D, may be made long enough and the frame wide enough, so that two or a series of belts and knives may be carried by the same roller for the purposes specified; and that the frame may be supplied with a proper number of arches provided with prongs and adapted to the several belts carried by the roller as above mentioned.

I believe I have described and represented my invention so as to enable any person skilled in the art to make and use it.

I will now state what I desire to secure by Letters Patent, to wit, I claim—

1. The belt K, armed with teeth L, L, in combination with the stationary prongs N, N, which catch and hold the husks, and yield to let the ears of corn pass or be carried forward by the belt and teeth, so as to separate the corn from the husks. And in combination with the belt K, armed as above described, I claim the wires M, M, to clear the husks from the underside of the ears of corn.

2. I claim the wires or prongs Q, Q, or their equivalents to clear the husks from the teeth L, L, on the belt K, substantially as described.

3. I claim the arches G, G, constructed and arranged substantially as described in combination with the rotating knives for severing the butt stalk from the ears of corn.

L. F. WARD.

Attest:
J. H. TRIPP,
I. COMSTOCK.